(12) United States Patent
Raichelgauz et al.

(10) Patent No.: US 9,031,999 B2
(45) Date of Patent: *May 12, 2015

(54) SYSTEM AND METHODS FOR GENERATION OF A CONCEPT BASED DATABASE

(71) Applicant: Cortica, Ltd., Tirat Carmel (IL)

(72) Inventors: Igal Raichelgauz, Herzelia (IL); Karina Odinaev, Haifa (IL); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 73 days.

This patent is subject to a terminal disclaimer.

(21) Appl. No.: 13/766,463

(22) Filed: Feb. 13, 2013

(65) Prior Publication Data

US 2013/0159311 A1 Jun. 20, 2013

Related U.S. Application Data

(63) Continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a (Continued)

(30) Foreign Application Priority Data

| Oct. 26, 2005 | (IL) | 171577 |
| Jan. 29, 2006 | (IL) | 173409 |
| Aug. 21, 2007 | (IL) | 185414 |

(51) Int. Cl.
G06F 17/30 (2006.01)

(52) U.S. Cl.
CPC ...... *G06F 17/30023* (2013.01); *G06F 17/3002* (2013.01); *Y10S 707/99943* (2013.01); *Y10S 707/99948* (2013.01)

(58) Field of Classification Search
CPC ............... G06F 17/3002; G06F 17/30023
See application file for complete search history.

(56) References Cited

U.S. PATENT DOCUMENTS

| 5,940,821 A | 8/1999 | Wical |
| 5,987,454 A | 11/1999 | Hobbs |

(Continued)

FOREIGN PATENT DOCUMENTS

| WO | 02/31764 | 4/2002 |
| WO | 2007/049282 | 5/2007 |

OTHER PUBLICATIONS

Foote, Jonathan, et al. "Content-Based Retrieval of Music and Audio", 1997 Institute of Systems Science, National University of Singapore, Singapore (Abstract).

(Continued)

*Primary Examiner* — Anteneh Girma
(74) *Attorney, Agent, or Firm* — M&B IP Analysts, LLC (57) ABSTRACT

A method for generating a concept database respective of a plurality of multimedia data elements (MMDEs) comprises generating a plurality of items from a received MMDE of the plurality of MMDEs; determining the items that are of interest for signature generation; generating at least one signature responsive to at least one item of interest of the received MMDE of the plurality of MMDEs; clustering a plurality of signatures received from the signature generator responsive of the plurality of MMDEs; reducing the number of signatures in each cluster to a create a signature reduced cluster (SRC) of the cluster; associating metadata with the SRC to a concept structure comprised of a plurality of SRCs and their associated metadata; and generating at least one index for mapping the received MMDE to at least one concept structure, wherein the concept database includes concept structures and the generated indices for the plurality of MMDEs.

19 Claims, 7 Drawing Sheets

Related U.S. Application Data continuation-in-part of application No. 12/195,863, filed on Aug. 21, 2008, now Pat. No. 8,326,775, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/348,888, filed on Jan. 5, 2009, which is a continuation-in-part of application No. 12/084,150, filed on Apr. 7, 2009, now Pat. No. 8,655,801, and a continuation-in-part of application No. 12/195,863, filed on Aug. 21, 2008, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, and a continuation-in-part of application No. 12/195,863, filed on Aug. 21, 2008, and a continuation-in-part of application No. 12/348,888, filed on Jan. 5, 2009.

(56) References Cited

U.S. PATENT DOCUMENTS

| | | |
|---|---|---|
| 6,038,560 A | 3/2000 | Wical |
| 6,122,628 A | 9/2000 | Castelli et al. |
| 6,240,423 B1 | 5/2001 | Hirata |
| 6,243,375 B1 | 6/2001 | Speicher |
| 6,363,373 B1 | 3/2002 | Steinkraus |
| 6,381,656 B1 | 4/2002 | Shankman |
| 6,493,692 B1 | 12/2002 | Kobayashi et al. |
| 6,493,705 B1 | 12/2002 | Kobayashi et al. |
| 6,523,022 B1 | 2/2003 | Hobbs |
| 6,526,400 B1 | 2/2003 | Takata et al. |
| 6,560,597 B1 | 5/2003 | Dhillon et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,675,159 B1 | 1/2004 | Lin et al. |
| 6,728,706 B2 | 4/2004 | Aggarwal et al. |
| 6,754,435 B2 | 6/2004 | Kim |
| 6,819,797 B1 | 11/2004 | Smith et al. |
| 6,836,776 B2 | 12/2004 | Schreiber |
| 6,901,207 B1 | 5/2005 | Watkins |
| 6,970,881 B1 | 11/2005 | Mohan et al. |
| 6,978,264 B2 | 12/2005 | Chandrasekar et al. |
| 7,013,051 B2 | 3/2006 | Sekiguchi et al. |
| 7,124,149 B2 | 10/2006 | Smith et al. |
| 7,260,564 B1 | 8/2007 | Lynn et al. |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,346,629 B2 | 3/2008 | Kapur et al. |
| 7,392,238 B1 | 6/2008 | Zhou et al. |
| 7,406,459 B2 | 7/2008 | Chen et al. |
| 7,450,740 B2 | 11/2008 | Shah et al. |
| 7,523,102 B2 | 4/2009 | Bjarnestam et al. |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 8,000,655 B2 | 8/2011 | Wang et al. |
| 8,316,005 B2 | 11/2012 | Moore |
| 2002/0123928 A1 | 9/2002 | Eldering et al. |
| 2003/0041047 A1 | 2/2003 | Chang et al. |
| 2004/0153426 A1 | 8/2004 | Nugent |
| 2005/0177372 A1 | 8/2005 | Wang et al. |
| 2006/0031216 A1 | 2/2006 | Semple et al. |
| 2006/0236343 A1 | 10/2006 | Chang |
| 2006/0242554 A1 | 10/2006 | Gerace et al. |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0038608 A1 | 2/2007 | Chen |
| 2007/0074147 A1 | 3/2007 | Wold |
| 2007/0130112 A1 | 6/2007 | Lin |
| 2007/0130159 A1 | 6/2007 | Gulli et al. |
| 2007/0174320 A1 | 7/2007 | Chou |
| 2007/0195987 A1 | 8/2007 | Rhoads |
| 2007/0244902 A1 | 10/2007 | Seide et al. |
| 2007/0253594 A1 | 11/2007 | Lu et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2008/0049629 A1 | 2/2008 | Morrill |
| 2008/0072256 A1 | 3/2008 | Boicey et al. |
| 2008/0172615 A1 | 7/2008 | Igelman et al. |
| 2008/0201299 A1 | 8/2008 | Lehikoinen et al. |
| 2008/0313140 A1* | 12/2008 | Pereira et al. ............ 707/2 |
| 2009/0037408 A1 | 2/2009 | Rodgers |
| 2009/0089587 A1 | 4/2009 | Brunk et al. |
| 2009/0245603 A1 | 10/2009 | Koruga et al. |
| 2010/0318493 A1* | 12/2010 | Wessling ............ 707/609 |

OTHER PUBLICATIONS

Ribert et al. "An Incremental Hierarchical Clustering", Visicon Interface 1999, pp. 586-591.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

(56) References Cited

OTHER PUBLICATIONS

Maass, W. et al.: "Computational Models for Generic Cortical Microcircuits", Institute for Theoretical Computer Science, Technische Universitaet Graz, Graz, Austria, published Jun. 10, 2003.
Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.
Jaeger, H.: "The "echo state" approach to analysing and training recurrent neural networks", GMD Report, No. 148, 2001, pp. 1-43, XP002466251. German National Research Center for Information Technology.
Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.
Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.
Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
International Search Report for the corresponding International Patent Application PCT/IL2006/001235; Date of Mailing: Nov. 2, 2008.
International Search Authority: "Written Opinion of the International Searching Authority" (PCT Rule 43bis.1) including International Search Report for International Patent Application No. PCT/US2008/073852; Date of Mailing: Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.
IPO Examination Report under Section 18(3) for corresponding UK application No. GB1001219.3, dated Sep. 12, 2011.

\* cited by examiner

SYSTEM AND METHODS FOR GENERATION OF A CONCEPT BASED DATABASE

CROSS-REFERENCE TO RELATED APPLICATIONS

This application is a continuation-in-part of U.S. patent application Ser. No. 13/602,858 filed Sep. 4, 2012, which is a continuation of U.S. patent application Ser. No. 12/603,123, filed on Oct. 21, 2009, now issued as U.S. Pat. No. 8,266,185, which is a continuation-in-part of:

(1) U.S. patent application Ser. No. 12/084,150 having a filing date of Apr. 7, 2009, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006;

(2) U.S. patent application Ser. No. 12/195,863, filed Aug. 21, 2008, now pending, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888, filed Jan. 5, 2009, now pending, which is a CIP of U.S. patent application Ser. No. 12/084,150, filed on Apr. 7, 2009 and U.S. patent application Ser. No. 12/195,863 filed on Aug. 21, 2008; and (4) U.S. patent application Ser. No. 12/538,495, filed Aug. 10, 2009, now pending, which is a CIP of U.S. patent application Ser. No. 12/084,150 filed on Apr. 7, 2009, U.S. patent application Ser. No. 12/195,863, filed on Aug. 21, 2008; and U.S. patent application Ser. No. 12/348,888, filed Jan. 5, 2009. All of the applications referenced above are herein incorporated by reference.

TECHNICAL FIELD

The invention generally relates to content-management and search engines, and more particularly relates to the collection, clustering and creation of concept structures of multimedia data elements and creating a concept based database respective thereto.

BACKGROUND

With the abundance of multimedia data made available through various means in general and the Internet and world-wide-web (WWW) in particular, there is a need for effective ways of searching for, and management of such multimedia data. Searching, organizing and management of multimedia data in general and video data in particular may be challenging at best due to the difficulty of representing and comparing the information embedded in the video content, and due to the scale of information that needs to be checked. Moreover, when it is necessary to find a content of video by means of textual query, prior art cases revert to various metadata solutions that textually describe the content of the multimedia data. However, such content may be abstract and complex by nature and not necessarily adequately defined by the existing and/or attached metadata.

The rapid increase in multimedia databases, accessible for example through the Internet, calls for the application of new methods of representation of information embedded in video content. Searching for multimedia in general and for video data in particular is challenging due to the huge amount of information that has to be priority indexed, classified and clustered. Moreover, prior art techniques revert to model-based methods to define and/or describe multimedia data. However, by its very nature, the structure of such multimedia data may be too abstract and/or complex to be adequately represented by means of metadata. The difficulty arises in cases where the target sought for multimedia data is not adequately defined in words, or by respective metadata of the multimedia data. For example, it may be desirable to locate a car of a particular model in a large database of video clips or segments. In some cases the model of the car would be part of the metadata but in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "the Architecture") that is based on a PCT patent application publication number WO2007/049282 and published on May 3, 2007, entitled "A Computing Device, a System and a Method for Parallel Processing of Data Streams", assigned to common assignee, is hereby incorporated by reference for all the useful information it contains. Generally, the Architecture consists of a large ensemble of randomly, independently, generated, heterogeneous processing cores, mapping in parallel data-segments onto a high-dimensional space and generating compact signatures for classes of interest.

Searching multimedia data has been a challenge of past years and has therefore received considerable attention. Early systems would take a multimedia data element in the form of, for example an image, compute various visual features from it and then search one or more indexes to return images with similar features. In addition, values for these features and appropriate weights reflecting their relative importance could be also used. Searching and indexing techniques have improved over time to handle various types of multimedia inputs and handle them in an ever increasing effectiveness. However, subsequent to the exponential growth of the use of the Internet and the multimedia data available there, these prior art systems have become less effective in handling the multimedia data, due to the vast amounts already existing, as well as the speed at which new ones are added.

Searching has therefore become a significant challenge and even the addition of metadata to assist in the search has limited functionality. First, metadata may be inaccurate or not fully descriptive of the multimedia data, and second, not every piece of multimedia data can be accurately enough described by a sequence of textual metadata. A query model for a search engine has some advantages, such as comparison and ranking of images based on objective visual features, rather than on subjective image annotations. However, the query model has its drawbacks as well. Certainly when no metadata is available and only the multimedia data needs to be used, the process requires significant effort. Those skilled in the art will appreciate that there is no known intuitive way of describing multimedia data. Therefore, a large gap may be found between a user's perception or conceptual understanding of the multimedia data and the way it is actually stored and manipulated by a search engine.

Current generation of web applications have become more and more effective at aggregating massive amounts of data of different multimedia content, such as, pictures, videos, clips, paintings and mash-ups, and are capable of slicing and dicing it in different ways, as well as searching it and displaying it in an organized fashion, by using, for example, concept networks. A concept may enable understanding of a multimedia data from its related content. However, current art is unable to add any real "intelligence" to the mix, i.e., no new knowledge is extracted from the multimedia data that are aggregated by such systems. Moreover, the systems tend to be non-scalable due to the vast amounts of data they have to handle. This, by definition, hinders the ability to provide high quality searching for multimedia content.

There is therefore a need in the art to overcome the deficiencies of the prior art solutions and to provide the building element for a search engine for content-management of multimedia data that is intelligent, effective and scalable.

SUMMARY

Certain embodiments disclosed herein include a method for generating a concept database respective of a plurality of multimedia data elements (MMDEs). The method comprises generating a plurality of items from a received MMDE of the plurality of MMDEs; determining the items that are of interest for signature generation; generating at least one signature responsive to at least one item of interest of the received MMDE of the plurality of MMDEs; clustering a plurality of signatures received from the signature generator responsive of the plurality of MMDEs; reducing the number of signatures in each cluster to a create a signature reduced cluster (SRC) of the cluster; associating metadata with the SRC to a concept structure comprised of a plurality of SRCs and their associated metadata; and generating at least one index for mapping the received MMDE to at least one concept structure, wherein the concept database includes concept structures and the generated indices for the plurality of MMDEs.

Certain embodiments disclosed herein include a system for generating a concept database respective of a plurality of multimedia data elements (MMDEs). The system comprises an attention processor (AP) for generating a plurality of items from a received MMDE of the plurality of MMDEs and determining which of the generated items are of interest for signature generation; a signature generator (SG) for generating at least one signature responsive to at least one item of interest of the received MMDE of the plurality of MMDEs; a clustering processor (CP) for clustering a plurality of signatures received from the signature generator responsive of the plurality of MMDEs and creating a signature reduced cluster (SRC); a concept generator (CG) for associating metadata with the SRC and forming a concept structure comprised of a plurality of SRCs and their associated metadata; and an index generator (IG) for generating at least one index for mapping the received MMDE to at least one concept structure, wherein the concept database includes concept structures and the generated indices for the plurality of MMDEs.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A large-scale web-platform for a multimedia deep-content-classification (DCC) system configured to continuously create a knowledge database for multimedia data can be utilized to achieve the embodiments disclosed herein. The DCC system initially receives a large number of multimedia data elements (MMDEs) to create a knowledge base that is condensed into concept structures that are efficient to store, retrieve and check for matches. As new MMDEs are collected they are efficiently added to the knowledge base and concept structures, such that the computing resources requirement for achieving this operation is generally sub-linear rather than linear or exponential. The DCC system extracts patterns from each MMDE and selects the important/salient patterns for the creation of signatures thereof. A process of inter-matching between the patterns found by clustering, is followed by reduction in the number of signatures in a cluster to a minimum that maintains matching and enables generalization to new MMDEs. Metadata respective of the MMDEs is thereby produced, forming together with the reduced clusters into a concept structure.

According to various embodiments disclosed herein, a concept database (DB) is populated. The concept-based DB indexes multimedia data elements (MMDEs) into concept structures. Each new MMDE is mapped to the concept DB which creates a set of indices. The indices of the elements are stored, while the raw data may be deleted or saved future uses.

According to one embodiment, the concept DB is comprised of two layers: (a) a concept structures database; and (b) a database of indices of original MMDEs mapped to the concept structures-database. The architecture of concept DB enables an external system to perform content-management operations on the indices database because the volume of the indices is lower, thus the analysis requires less computational resources. All the necessary updates are performed by adding, removing, or updating the concept structures in the concept DB.

Figure 1:
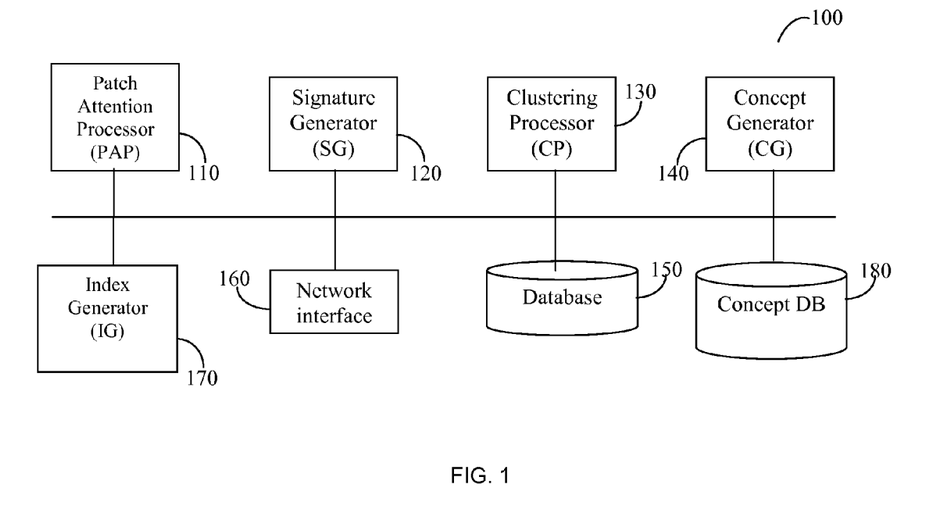
FIG. 1 is a diagram of a DCC system for creating concept structures in accordance with an embodiment.

FIG. 1 shows an exemplary and non-limiting diagram of a DCC system 100 for creating concept structures. The DCC system 100 receives multimedia data elements (MMDEs), for example, from the Internet via the network interface 160. The MMDEs include, but are not limited to, images, graphics, video streams, video clips, audio streams, audio clips, video frames, photographs, images of signals, combinations thereof, and portions thereof. The images of signals are images such as, but not limited to, medical signals, geophysical signals, subsonic signals, supersonic signals, electromagnetic signals, infrared signals, and combinations thereof.

The MMDEs may be stored in a database (DB) 150, and references to the MMDEs are kept in the DB 150 for future retrieval of the respective multimedia data element. Such a reference may be, but is not limited to, a universal resource locator (URL).

Every MMDE in the DB 150, or referenced therefrom, is then processed by a patch attention processor (PAP) 110 resulting in a plurality of patches that are of specific interest, or otherwise of higher interest than other patches. A more general pattern extraction, such as an attention processor (AP) can also be used in lieu of patches. The AP receives the MMDE that is partitioned into items. An item may be an extracted pattern or a patch, or any other applicable partition depending on the type of the MMDE. The functions of the PAP 110 are described herein below in more detail. Those patches that are of higher interest are then used by a signature generator (SG) 120 to generate signatures respective of the patch. The operation of the SG 120 is described in more detail herein below.

A clustering process (CP) 130 initiates a process of inter-matching of the signatures upon determining that there are a number of patches above a predefined threshold. The threshold may be defined to be large enough to enable proper and meaningful clustering. With a plurality of clusters a process of clustering reduction takes place, so as to extract the most useful data about the cluster and keep it at an optimal size to produce meaningful results. The process of cluster reduction is continuous. When new signatures are provided after the initial phase of the operation of the CP 130, the new signatures may be immediately checked against the reduced clusters to save on the operation of the CP 130. A more detailed description of the operation of the CP 130 is provided herein below.

A concept generator (CG) 140 operates to create concept structures from the reduced clusters provided by the CP 130. Each concept structure is comprised of a plurality of metadata associated with the reduced clusters. The result is a compact representation of a concept that can now be easily compared against a MMDE to determine if the received MMDE matches a concept structure stored, for example, in the DB 150. This matching operation can be performed by the CG 140, for example, and without limitation, by providing a query to the DCC system 100 for finding a match between a concept structure and a MMDE. A more detailed description of the operation of the CG 140 is provided herein below.

An index generator (IG) 170 is configured to extract metadata related to each of the plurality of MMDEs stored in the DB 150 or referenced therefrom. The metadata may include patches created by the PAP 110 for each MMDE. The metadata may also include one or more signatures generated by the SG 120 for each MMDE. The metadata may further include the concept structure identified for reach of the MMDE. Based on the metadata extracted, the IG 170 is configured to generate a plurality of compressed conceptual representations which will be referred to as indices, for each of the plurality of MMDEs stored in the DB 150 or referenced therefrom.

In one embodiment, an index for a MMDE is generated by matching its respective metadata to a plurality of concept structures provided by the CG 140. Upon at least one matching concept structure being detected, an index to the matching structure is generated. For example, an image of tulip would be mapped to a concept structure of flowers.

The plurality of indices is then stored in a concept DB 180 also included in the DDC system 100. The content management operations, such as but not limited to, data retrieval, search, and so on are performed using the indices saved in the concept DB 180. In certain configurations, the concept DB 180 may be part of the DB 150.

According to one embodiment, the concept DB 180 includes two layers of data structures (or databases): one is for the concept structures and the other is for the indices of original MMDEs mapped to the concept structures in the concept structures-database.

As noted above, a concept structure is a reduced cluster of MMDEs together with their respective metadata, thus the DCC system 100 can generate a number of concept structures significantly smaller than the number of MMDEs. Therefore, the number of indices required in the concept DB 180 is significantly smaller relative to a solution that requires indexing of raw MMDEs.

For example, if one billion ($10^9$) MMDEs need to be checked for a match against another one billion MMDEs, typically the result is that no less than $10^9 \times 10^9 = 10^{18}$ matches have to take place, a daunting undertaking. The DCC system 100 would typically have around 10 million concept structures or less, and therefore at most only $2 \times 10^6 \times 10^9 = 2 \times 10^{15}$ comparisons need to take place, a mere 0.2% of the number of matches that have had to be made by other solutions. The number of generated indices is at most $2 \times 10^5$. As the number of concept structures grows significantly slower than the number of MMDEs, the advantages of the DCC system 100 would be apparent to one with ordinary skill in the art.

The operation of the PAP 110 will now be provided in greater detail with respect to a MMDE in a form of an image. However, this should not be understood as to limit the scope of the disclosed embodiments as other types of MMDEs are specifically included herein and may be handled by the PAP 110.

Figure 2:
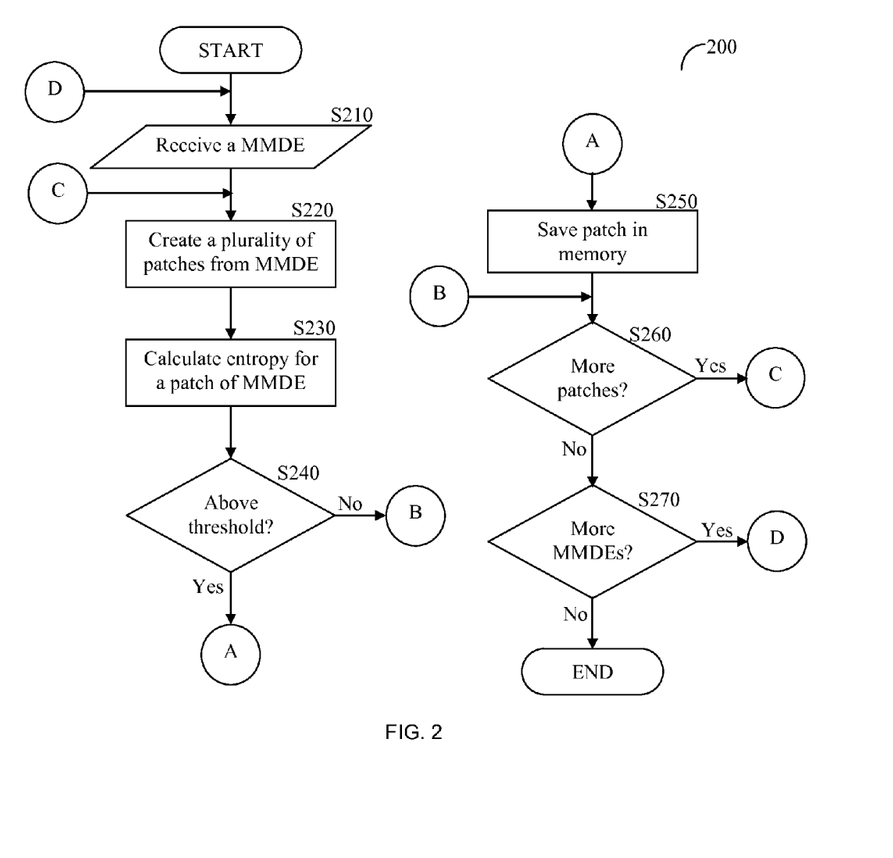
FIG. 2 is a flowchart illustrating the operation of the patch attention processor (PAP) in accordance with an embodiment.

FIG. 2 depicts an exemplary and non-limiting flowchart 200 of the operation of the PAP 110. In S210, the PAP 110 receives a MMDE from a source for such MMDEs. Such a source may be a system that feeds the DCC system 100 with MMDEs or other sources for MMDEs, for example, the world-wide-web (WWW). In S220, the PAP 110 creates a plurality of patches from the MMDE. A patch of an image is defined by, for example, its size, scale, location and orientation. A patch may be, for example and without limitation, a portion of an image of a size, 20 pixels by 20 pixels, of an image that is 1,000 pixels by 500 pixels. In the case of audio, a patch may be a segment of audio 0.5 seconds in length from a 5 minute audio clip.

In S230, a patch not previously checked is processed to determine its entropy. The entropy is a measure of the amount of interesting information that may be present in the patch. For example, a continuous color of the patch has little interest, whereas sharp edges, corners or borders, will result in higher entropy representing a lot of interesting information. In one embodiment, a plurality of statistically independent cores, the operation of which is discussed in more detail herein below, is used to determine the level-of-interest of the image and a process of voting takes place to determine whether the patch is of interest or not.

In S240, it is checked whether the entropy was determined to be above a predefined threshold, and if so execution continues with S250; otherwise, execution continues with S260. In S250 the patch having entropy above the threshold is stored for future use by the SG 120 in, for example, DB 150. In S260 it is checked whether there are more patches of the MMDE to be checked, and if so execution continues with S220; otherwise execution continues with S270. In S270 it is checked whether there are additional MMDEs, and if so execution continues with S210; otherwise, execution terminates. It would be appreciated by those of skill in the art that this process reduces the information that must be handled by the DCC system 100 by focusing on areas of interest in the MMDEs rather than on areas that are less meaningful for the formation of a concept structure.

Figure 3:
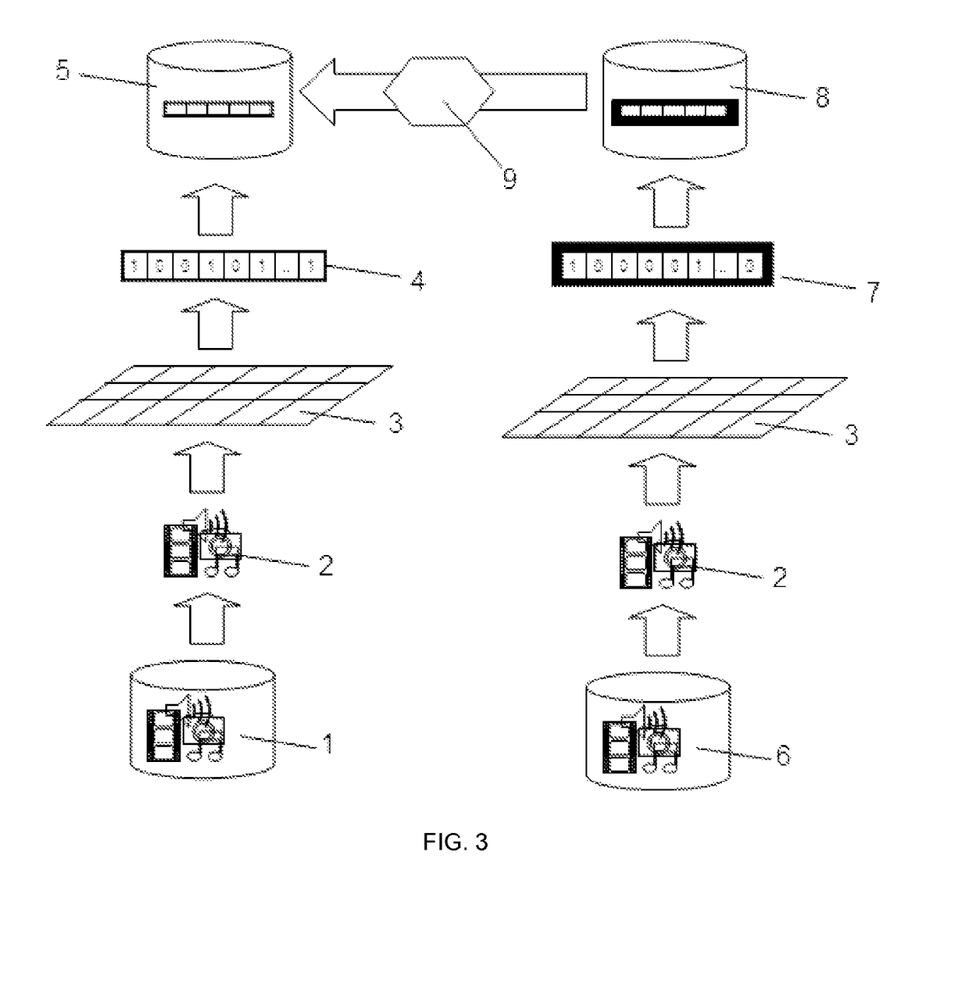
FIG. 3 is a block diagram depicting the basic flow of information in a large-scale video matching system.

A high-level description of the process for large scale video matching performed by a Matching System is depicted in FIG. 3. Video content segments 2 from a Master DB 6 and a Target DB 1 are processed in parallel by a large number of independent computational Cores 3 that constitute the Architecture. Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Referring back to FIG. 3, at the final step, Target Robust Signatures and/or Signatures are effectively matched, by a matching algorithm 9, to Master Robust Signatures and/or Signatures database to find all matches between the two databases.

A brief description of the operation of the SG 120 is therefore provided, this time with respect to a MMDE which is a sound clip. However, this should not be understood as to limit the scope of the disclosed embodiments and other types of MMDEs that are specifically included herein and may be handled by the SG 120. To demonstrate an example of signature generation process, it is assumed, merely for the sake of simplicity and without limitation on the generality of the invention, that the signatures are based on a single frame, leading to certain simplification of the computational core's generation. The Matching System shown in FIG. 3 is extensible for signatures generation capturing the dynamics in-between the frames and the information of the frame's patches.

Figure 4:
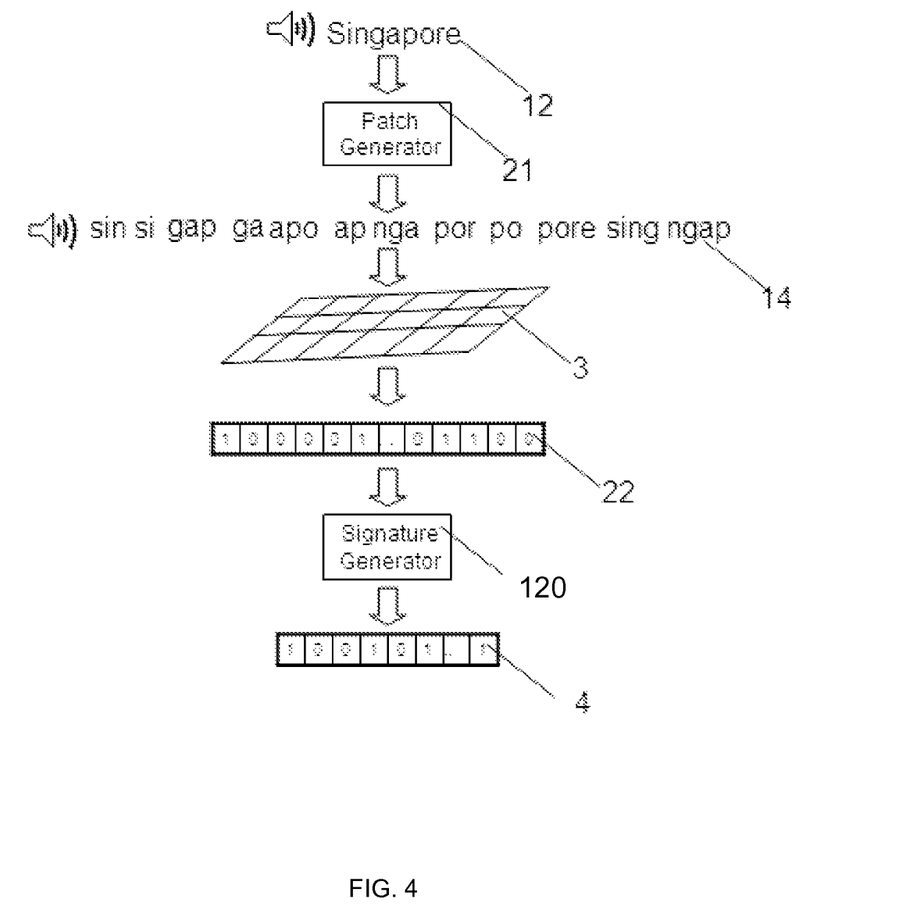
FIG. 4 is a diagram showing the flow of patches generation, response vector generation, and signature generation in a large-scale speech-to-text system.

The signatures generation process is now described with reference to FIG. 4. The first step in the process of signatures generation from a given speech-segment is to break-down the speech-segment into K patches 14 of random length P and random position within the speech segment 12. The break-down is performed by the patch generator component 21. The value of K is determined based on optimization, considering the tradeoff between accuracy rate and the number of fast matches required in the flow process of the System. In the next step, all the K patches are injected in parallel to all L computational Cores 3 to generate K response vectors 22. The vectors 22 are fed into the SG 120 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the Cores. The computational cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i = \{n_i\}$ ($1 \leq i \leq L$) may consist of a single leaky integrate-to-threshold unit (LTU) node or more nodes. The node ni equations are:

$$V_i = \sum_j w_{ij} k_j$$

$n_i = \theta(V_i - TH_x)$; $\theta$ is a Heaviside step function; $w_{ij}$ is a coupling node unit (CNU) between a node i and an image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature (ThS) and Robust Signature (ThRS) are set apart, after optimization, according to at least one or more of the following criteria:

I: For: $V_i > Th_{RS}$
    $1 - p(V > Th_S) - 1 - (1-\epsilon)^l \ll 1$ i.e., given that I nodes (cores) constitute a Robust Signature of a certain image I, the probability that not all of these I nodes will belong to the Signature of same, but noisy image, $\tilde{I}$ is sufficiently low (according to a system's specified accuracy).

II: $p(V_i > Th_{RS}) \approx l/L$
i.e., approximately l out of the total L nodes can be found to generate Robust Signature according to the above definition.

III: Both Robust Signature and Signature are generated for a certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison to the original data. The detailed description of the Signature generation can be found U.S. Pat. Nos. 8,326,775 and 8,312,031, assigned to common assignee, which are hereby incorporated by reference for all the useful information they contain.

Computational Core generation is a process of definition, selection and tuning of the Architecture parameters for a certain realization in a specific system and application. The process is based on several design considerations, such as: (a) The Cores should be designed so as to obtain maximal independence, i.e., the projection from a signal space should generate a maximal pair-wise distance between any two cores' projections into a high-dimensional space; (b) The Cores should be optimally designed for the type of signals they process, i.e. the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power, and, (c) The Cores should be optimally designed with regard to invariance to a set of signal distortions, of interest in relevant application.

Detailed description of the Computational Core generation and the process for configuring such cores is discussed in more detail in the co-pending U.S. patent application Ser. No. 12/084,150 referenced above.

According to certain embodiments, signatures are generated by the SG 120 responsive of patches received either from the PAP 110, or retrieved from the DB 150. It should be noted that other ways for generating signatures may also be used for the purpose the DCC system 100. Furthermore, as noted above, the array of cores may be used by the PAP 110 for the purpose of determining if a patch has an entropy level that is of interest for signature generation according to the principles of the invention. The generated signatures are stored, for example, in the DB 150, with reference to the MMDE and the patch for which it was generated thereby enabling back annotation as may be necessary.

Portions of the CP 130 have been discussed in detail in the co-pending U.S. patent application Ser. No. 12/507,489, entitled "Unsupervised Clustering of Multimedia Data Using a Large-Scale Matching System", filed Jul. 22, 2009, assigned to common assignee (the "'489 Application"), and which is hereby incorporated for all that it contains. In accordance with an embodiment, an inter-match process and clustering thereof is utilized. The process can be performed on signatures provided by the SG 120. It should be noted that this inter-matching and clustering process is merely an example for the operation of the CP 130 and other inter-matching and/or clustering processes can also be utilized.

Following is a description of the inter-match and clustering process. The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. Each cluster is represented by a small/compressed number of signatures, for example, signatures generated by the SG 120 as further explained hereinabove, which can be increased by variants. This results in a highly compressed representation of the content-universe. In certain implementation, a connection graph between the MMDEs of a cluster may be stored. The graph can then be used to assist a user searching for data to move along the graph in the search of a desired multimedia data element.

Upon determination of a cluster, a signature for the whole cluster may be generated based on the signatures of the multimedia data elements that belong to the cluster. It should be appreciated that using a Bloom filter may be used to reach such signatures. Furthermore, as the signatures generated by the SG 120 are correlated to some extent, the hash functions of the Bloom filter may be replaced by simpler pattern detectors, with the Bloom filter being the upper limit.

While signatures are used herein as the basic data elements, it should be realized that other data elements may be clustered using the system 100, for example, when a system generating data items is used, where the data items generated may be clustered according to the disclosed embodiments. Such data items may be, without limitation, multimedia data elements. The clustering process may be performed by dedicated hardware or by using a computing device having storage to store the data items generated by the system and then performing the process described herein above. Then, the clusters can be stored in memory for use as may be deemed necessary.

The CP 130 further uses an engine designed to reduce the number of signatures used in a structure. This can be performed by extracting only the most meaningful signatures that identify the cluster uniquely. This can be done by testing a removal of a signature from a cluster and checking if the MMDEs associated with the cluster are still capable of being recognized by the cluster through signature matching. The process of signature extraction is on-going as the DCC system 100 operates. It should be noted that after initialization, upon signature generation by the SG 120 of a MMDE, its respective signature is first checked against the clusters to see if there is a match, and if so it may not be necessary to add the signature to the cluster or clusters, but rather by simply associating the MMDE with the identified cluster or clusters. However, in some cases where additional refinement of the concept structure is possible, the signature may be added, or at times even replace one or more of the existing signatures in the reduced cluster. If no match is found then the process of inter-matching and clustering may take place.

Figure 5:
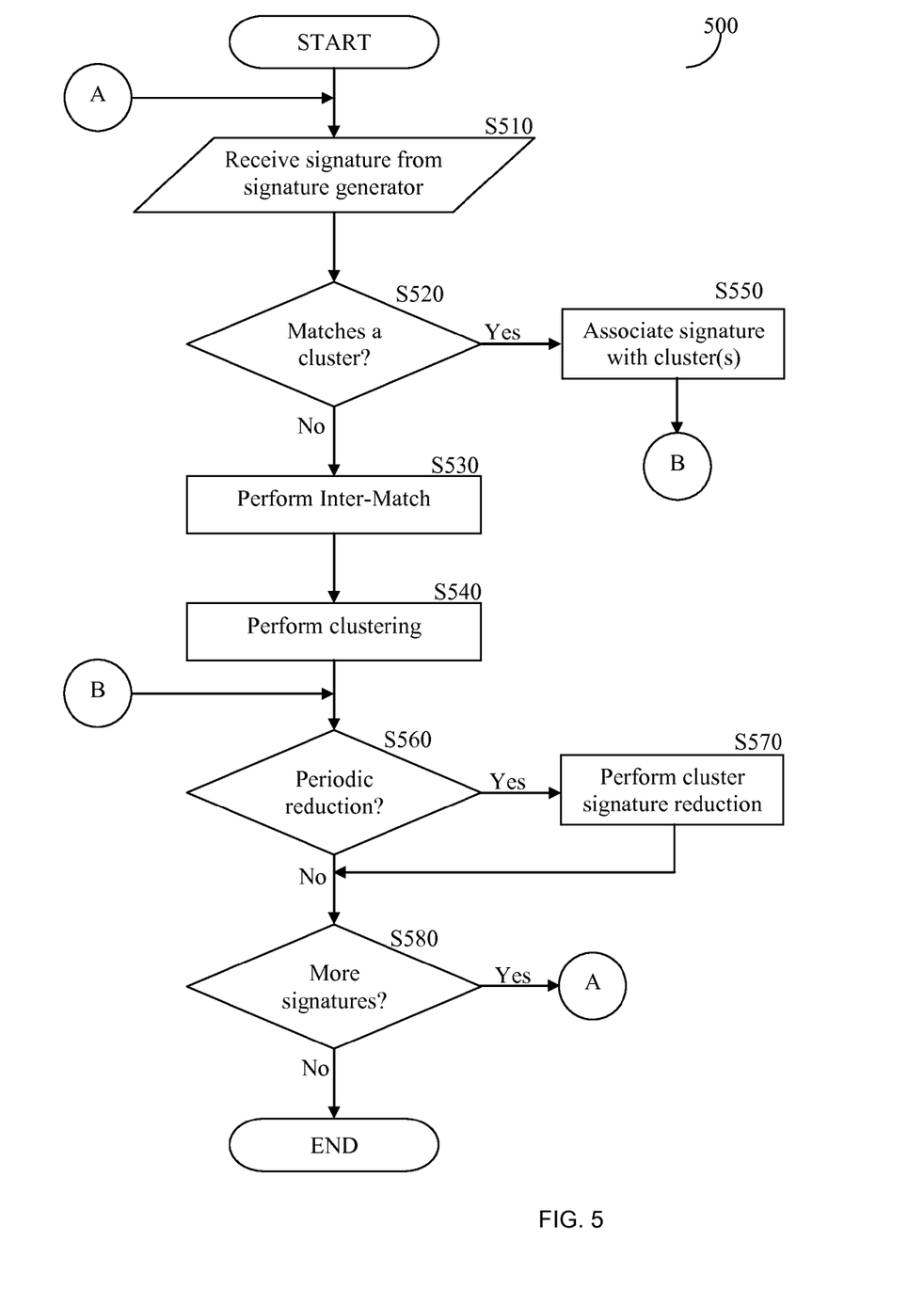
FIG. 5 is a flowchart illustrating the operation of the clustering processor in accordance with one embodiment.

FIG. 5 depicts an exemplary and non-limiting flowchart 500 of the operation of the CP 130. In S510, a signature of a MMDE is received, for example from the SG 120. In S520 it is checked whether the signature matches one or more existing clusters and if so execution continues with S550; otherwise, execution continues with S530. In S530 an inter-match between a plurality of signatures previously received by the DCC system 100 is performed, for example in accordance with the principles of the '489 Application. As may be necessary the DB 150 may be used to store results or intermediate results as the case may be, however, other memory elements may also be used. In S540, a clustering process takes place, for example, as discussed in the '489 Application. As may be necessary the DB 150 may be used to store results or intermediate results as the case may be, however, other memory elements may be used for this purpose as well.

In S550, the signature identified to match one or more clusters is associated with the existing cluster(s). In S560, it is checked whether a periodic cluster reduction is to be performed, and if so execution continues with S570; otherwise, execution continues with S580. In S570, the cluster reduction process is performed. Specifically, the purpose of the operation is to ensure that in the cluster there remains the minimal number of signatures that still identify all of the MMDEs that are associated with the signature reduced cluster (SRC). This can be performed, for example, by attempting to match the signatures of each of the MMDEs associated with the SRC having one or more signatures removed there from. The process of cluster reduction for the purpose of generating SRCs is performed in parallel and independent of the process described herein above. In such a case after either S540 or S550, the operation of S580 takes place.

In S580, it is checked whether there are additional signatures to be processed and if so execution continues with S510; otherwise, execution terminates. SRCs may be stored in memory, such as the DB 150, for the purpose of being used by other elements comprising the DCC system 100.

The CG 140 performs two tasks, it associates metadata to the SRCs provided by the CP 130 and it associates between similar clusters based on commonality of metadata. Exemplary and non-limiting methods for associating metadata with MMDEs is described in U.S. patent application Ser. No. 12/348,888, entitled "Methods for Identifying Relevant Metadata for Multimedia Data of a Large-Scale Matching System", filed on Jan. 5, 2009, assigned to common assignee (the "'888 Application"), and which is hereby incorporated for all that it contains. One embodiment of the '888 Application includes a method for identifying and associating metadata to input MMDEs. The method comprises comparing an input first MMDE to at least a second MMDE; collecting metadata of at least the second MMDE when a match is found between the first MMDE and at least the second MMDE; associating at least a subset of the collected metadata to the first MMDE; and storing the first MMDE and the associated metadata in a storage.

Another embodiment of the '888 Application includes a system for collecting metadata for a first MMDE. The system comprises a plurality of computational cores enabled to receive the first MMDE, each core having properties statistically independent of each other core, each core generates responsive to the first MMDE a first signature element and a second signature element, the first signature element being a robust signature; a storage unit for storing at least a second MMDE, metadata associated with the second MMDE, and at least one of a first signature and a second signature associated with the second MMDE, the first signature being a robust signature; and a comparison unit for comparing signatures of MMDEs coupled to the plurality of computational cores and further coupled to the storage unit for the purpose of determining matches between multimedia data elements; wherein responsive to receiving the first MMDE the plurality of computational cores generate a respective first signature of said first MMDE and/or a second signature of said first MMDE, for the purpose of determining a match with at least a second MMDE stored in the storage and associating metadata associated with at least the second MMDE with the first MMDE.

Similar processes to match metadata with a MMDE or signatures thereof can also be utilized, however, these should be viewed only as exemplary and non-limiting implementations, and other methods of operation may be used with respect to the DCC system 100 without departing from the scope of the invention. Accordingly, each SRC is associated with metadata which is the combination of the metadata associated with each of the signatures that are included in the respective SRC, preferably without repetition of metadata. A plurality of SRCs having metadata may now be associated to each other based on the metadata and/or partial match of signatures. For example, and without limitation, if the metadata of a first SRC and the metadata of a second SRC overlap more than a predetermined threshold level, for example by 50% of the metadata match, they may be considered associated clusters that form a concept structure. Similarly, a second threshold level can be used to determine if there is an association between two SRCs where at least a number of signatures above the second threshold are identified as a match with another SRC. From a practical example one may want to consider the concept of Abraham Lincoln where images of the late President and features thereof, appear in a large variety of photographs, drawings, paintings, sculptures and more, and are associated as a concept structure of the concept "Abraham Lincoln". Each concept structure may then be stored in memory, for example, the DB 150, for further use.

Figure 6:
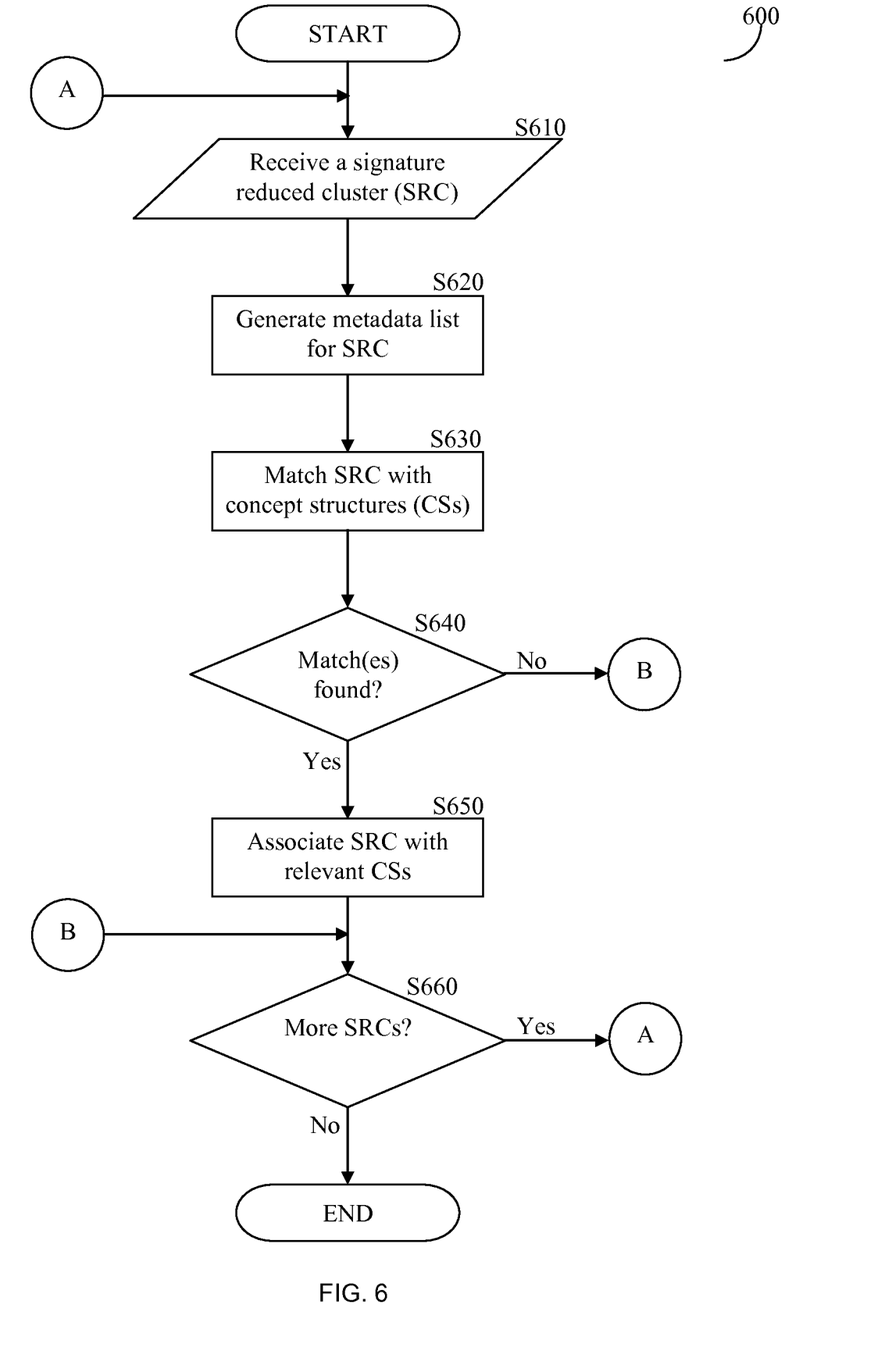
FIG. 6 is a flowchart illustrating the operation of the concept generator in accordance with one embodiment.

FIG. 6 shows an exemplary and non-limiting flowchart 600 of the operation of the CG 140. In S610, the CG 140 receives a SRC from either the CP 130 or by accessing, for example, the DB 150. In S620, metadata are generated for the signatures of the SRC. The process for generating metadata for the SRC is described in detail above. A list of the metadata is created for the SRC preferably with no metadata duplication. In one embodiment, the commonality of metadata is used to signify the strength of the metadata with respect to a signature and/or the SRC, i.e., a higher number of metadata repetitions is of more importance to the SRC than a lower number of repetitions. Furthermore, in one embodiment a threshold may be used to remove those metadata that have a significantly low rate of repetition as not being representative of the SRC.

In S630, the SRC is matched to previously generated SRCs to attempt to find various matches, as described, for example, hereinabove in more detail. In S640, it is checked if at least one match was found and if so, execution continues with S650; otherwise, execution continues with S660. In S650 the SRC is associated with one or more of the concept structures to which the SRC has been shown to match. In S660, it is checked whether additional SRCs are to be received, and if so execution continues with S610; otherwise, execution terminates.

A person skilled in the art should appreciate that the DCC system 100 creates automatically and in an unsupervised fashion concept structures of a wide variety of MMDEs. When checking a new MMDE it may be checked against the concept structures stored, for example, in the DB 150 and the concept DB 180, and upon detection of a match provides the concept information about the MMDE. With the number of concept structures being significantly lower than the number of MMDEs the solution is cost effective and scalable for the purpose of identification of content of a MMDE.

According to various embodiments disclosed herein, the concept structures are further utilized to index the MMDEs, in particular, to, utilize each MMDE to a set of indices that are created based on mapping to the concept structures database. The indices of the MMDEs are stored in the DB 180, whereas the MMDEs can be deleted.

Figure 7:
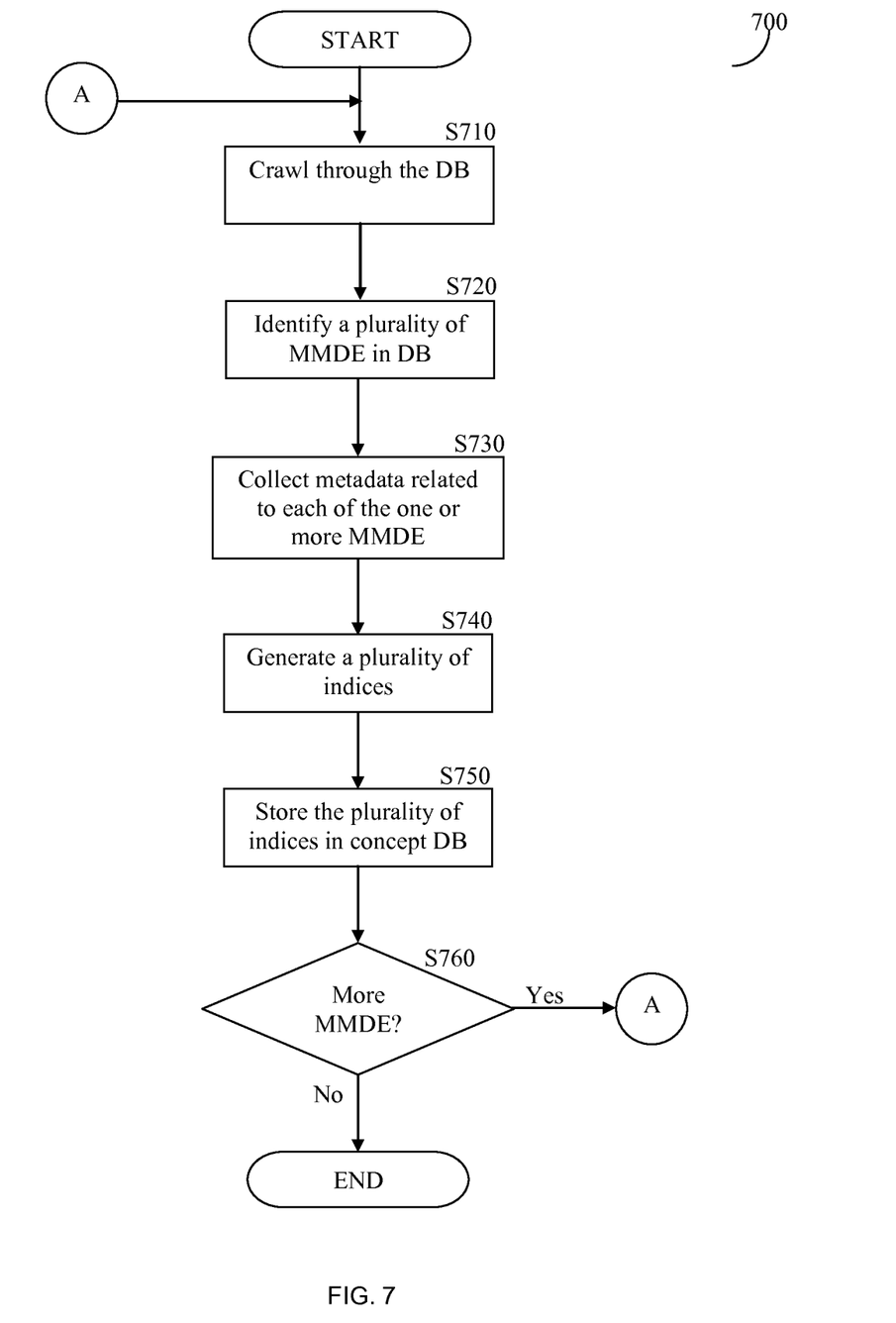
FIG. 7 is a flowchart illustrating a method for generating a concept database in accordance with one embodiment.

FIG. 7 shows an exemplary and non-limiting flowchart 700 of the operation of the IG 170 in accordance with one embodiment disclosed herein. In S710, the IG 170 crawls through the DB 150 to access and identify MMDEs stored therein or referenced therefrom. In S720, each of the identified MMDEs is marked as required for further processing. In S730, metadata respective of each of the identified MMDEs is collected. As noted above, the metadata may be in the form of the plurality of patches created by the PAP 110 from each MMDE, one or more signatures generated by the SG 120 respective of each MMDE, and the concept structure matched for each MMDE respective of the signatures of the MMDE. The metadata may be collected from such resources respectively.

In S740, using of the collected metadata, the IG 170 generates a plurality of indices respective of each MMDE. In one embodiment, S740 includes matching the metadata of a MMDE against concept structures saved in the concept DB 180. For each matching concept structure, an index is generated for the MMDE. The index is a mapping of a MMDE to a matching concept structure.

In S750, the plurality of indices is stored in the concept DB 180 for future use. As noted above, the concept DB 180, in an embodiment, maintains the concept structures. In another embodiment, the concept structures are saved in DB 150 which may also include DB 180. The concept structures are generated by the CG 140 as discussed above. It should be noted that if the metadata of the respective MMDE does not match any of concept structures, a request is sent for the CG 140 to create a new structure; alternatively an error message may be generated.

In S760, it is checked by the IG 170 whether there are additional MMDEs in the DB 150, and if so, execution continues with S710; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A system for generating concept database respective of a plurality of multimedia data elements (MMDEs), comprising:
   a memory;
   an attention processor (AP) for generating a plurality of items from a received MMDE of the plurality of MMDEs and determining which of the generated items that are of interest for signature generation;
   a signature generator (SG) for generating at least a signature responsive to at least an item of interest of the received MMDE of the plurality of MMDEs;
   a clustering processor (CP) for clustering a plurality of signatures received from the signature generator responsive of the plurality of MMDEs and creating a signature reduced cluster (SRC), wherein the clustering processor is further configured to:
      generate a clustering score for each signature of an MMDE of the plurality of MMDEs versus all other MMDEs of the plurality of MMDEs;
      determine a size of a diagonal matrix having a size corresponding to the number of the plurality of MMDEs; place the clustering score in a diagonal matrix in storage, one clustering score for each pair of MMDEs;
      create a new cluster element for each two cluster elements in the diagonal matrix having a clustering score that exceeds a threshold; and
      repeat the process at the newly created cluster element level each time using the new cluster elements generated as the plurality of cluster elements for the subsequent sequence, until a single cluster is reached or it is determined that a single cluster cannot be reached;
   a concept generator (CG) for associating metadata with the SRC and forming a concept structure comprised of a plurality of SRCs and their associated metadata; and
   an index generator (IG) for generating at least one index for mapping the received MMDE to at least one concept structure, wherein the concept database includes concept structures and the generated indices for the plurality of MMDEs, wherein the attention processor, the signature generator, the clustering processor, the concept generator, and the index generator are connected to the memory.

2. The system of claim 1, wherein the AP is a patch AP (PAP) that is configured to extract items in the form of patches from the received MMDE.

3. The system of claim 2, wherein the PAP is further configured to determine which patches to provide for the signature generation based on at least one of: an entropy level of a patch, corners identified in a patch, and borders identified in a patch.

4. The system of claim 1, wherein the AP is further configured to extract items in the form of patterns from the received MMDE.

5. The system of claim 1, wherein the CP is further configured to
   reduce the number of signatures in each cluster to a minimum that still identifies all the MMDEs associated with the cluster.

6. The system of claim 1, wherein the MMDE is at least one of: an image, graphics, a video stream, a video clip, an audio stream, an audio clip, a video frame, a photograph, images of signals, medical signals, geophysical signals, subsonic signals, supersonic signals, electromagnetic signals, and infrared signals.

7. The system of claim 1, wherein the SG comprises a plurality of computational cores, each computational core having properties statistically independent of each other computational core, each computational core generates responsive to the received MMDE at least one signature, wherein the at least one signature is robust to noise and distortions.

8. The system of claim 1, wherein the associated metadata is at least one of: a plurality of patches created by the PAP from each MMDE, the at least one signature generated by the SG respective of each MMDE, the concept matched for each MMDE respective of the signatures generated by the CP.

9. The system of claim 1, wherein the IG is further configured to:
   match metadata related to the received MMDE against concept structures;
   generate the index for the received MMDE, for each matching concept structure; and
   store a plurality of indices generated for the plurality of MMDEs in the concept database.

10. A method for generating a concept database respective of a plurality of multimedia data elements (MMDEs) comprising:
    generating a plurality of items from a received MMDE of the plurality of MMDEs;
    determining the items that are of interest for signature generation;
    generating at least one signature responsive to at least one item of interest of the received MMDE of the plurality of MMDEs;
    clustering a plurality of signatures received from the signature generator responsive of the plurality of MMDEs, wherein the clustering of the plurality of signatures includes:
       generating a clustering score for each signature of an MMDE of the plurality of MMDEs versus all other MMDEs of the plurality of MMDEs;
       determining a size of a diagonal matrix having a size corresponding to the number of the plurality of MMDEs;
       placing the clustering score in a diagonal matrix in storage, one clustering score for each pair of MMDEs;
       creating a new cluster element for each two cluster elements in the diagonal matrix having a clustering score that exceeds a threshold; and
       repeating the process at the newly created cluster element level each time using the new cluster elements generated as the plurality of cluster elements for the subsequent sequence, until a single cluster is reached or it is determined that a single cluster cannot be reached;

reducing the number of signatures in each cluster to a create a signature reduced cluster (SRC) of the cluster;

associating metadata with the SRC to a concept structure comprised of a plurality of SRCs and their associated metadata; and generating at least one index for mapping the received MMDE to at least one concept structure, wherein the concept database includes concept structures and the generated indices for the plurality of MMDEs.

11. The method of claim 10, wherein generating the plurality of items further comprising:

extracting items in the form of patches from the received MMDE by a patch AP (PAP).

12. The method of claim 11, further comprising:

determining which patches to provide for the signature generation based on at least one of: an entropy level of a patch, corners identified in a patch, and borders identified in a patch.

13. The method of claim 12, wherein generating the plurality of items further comprising:

extracting items in the form of patterns from the received MMDE.

14. The method of claim 12, wherein creating the SRC further comprising:

reducing the number of signatures in each cluster to a minimum that still identifies all the MMDEs associated with the cluster.

15. The method of claim 12, wherein the MMDE is at least one of: an image, graphics, a video stream, a video clip, an audio stream, an audio clip, a video frame, a photograph, images of signals, medical signals, geophysical signals, subsonic signals, supersonic signals, electromagnetic signals, and infrared signals.

16. The method of claim 12, wherein the at least one signature is generated using a signature generator (SG), wherein the SG comprises a plurality of computational cores, each computational core having properties statistically independent of each other computational core, each computational core generates, responsive to the received MMDE at least one signature, wherein the least one signature is robust to noise and distortions.

17. The method of claim 12, wherein the associated metadata is at least one of: a plurality of patches from each MMDE, the at least one signature generated respective of each MMDE, the concept matched for each MMDE respective of the at least one signature.

18. The method of claim 12, generating the at least one index further comprising:

matching metadata related to the received MMDE against concept structures; and generating the index for the received MMDE, for each matching concept structure; and storing a plurality of indices generated for the plurality of MMDEs in the concept database.

19. A non-transitory computer readable medium having stored thereon instructions for causing one or more processing units to execute the method according to claim 12.

* * * * *